US011392926B2

(12) United States Patent
Yeddula et al.

(10) Patent No.: US 11,392,926 B2
(45) Date of Patent: *Jul. 19, 2022

(54) SYSTEM, METHOD AND COMPUTER PROGRAM PRODUCT FOR AUTOMATIC AND REMOTE CONTROL OF NFC TRANSACTION PROCESSING

(71) Applicant: Visa International Service Association, San Francisco, CA (US)

(72) Inventors: Prasanth Yeddula, Sunnyvale, CA (US); Ashwini Laxminarayana Tantry, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,692

(22) Filed: Jan. 6, 2021

(65) Prior Publication Data

US 2021/0125172 A1  Apr. 29, 2021

Related U.S. Application Data

(63) Continuation of application No. 15/960,722, filed on Apr. 24, 2018, now Pat. No. 10,922,678.

(51) Int. Cl.
  *G06Q 20/32*  (2012.01)
  *G06F 8/61*  (2018.01)
  *G06Q 20/40*  (2012.01)

(52) U.S. Cl.
  CPC .......... *G06Q 20/3278* (2013.01); *G06F 8/61* (2013.01); *G06Q 20/401* (2013.01)

(58) Field of Classification Search
  CPC .. G06Q 20/3278; G06Q 20/401; G06Q 20/32; G06Q 20/40; G06F 8/61
  See application file for complete search history.

(56) References Cited

U.S. PATENT DOCUMENTS 6,808,111 B2  10/2004  Kashef et al.
8,793,192 B2   7/2014  Hammad et al.
(Continued)

OTHER PUBLICATIONS

"Ascert Provides Testing Support for Apple Pay System", News Ascert Automated End-to-End Testing and Certification, Dec. 2, 2014, pp. 1-2.
(Continued)

*Primary Examiner* — Kenneth Bartley
(74) *Attorney, Agent, or Firm* — The Webb Law Firm

(57) ABSTRACT

A method, system, and computer program product for automatic and remote control of NFC transaction processing. The method includes receiving transaction data associated with a transaction, automatically requesting a token associated with the transaction from a transaction processing network in response to receiving the transaction data, receiving the token from the transaction processing network, automatically and wirelessly transmitting the token from a first device to a second device via NFC in response to receiving the token from the transaction processing network, automatically transmitting the token to the transaction processing network in response to receiving the token from the first device, receiving an authorization response associated with the transaction from the transaction processing network, and determining a compatibility of an application associated with at least one of the first device and the second device with the transaction processing network based on the authorization response.

20 Claims, 7 Drawing Sheets

(56) References Cited

U.S. PATENT DOCUMENTS

| | | |
|---|---|---|
| 10,103,781 B2 | 10/2018 | Bellenger et al. |
| 10,460,316 B2 | 10/2019 | Stone |
| 2011/0246363 A1 | 10/2011 | Stone |
| 2012/0166337 A1 | 6/2012 | Park et al. |
| 2012/0284131 A1 | 11/2012 | Soffer et al. |
| 2014/0074605 A1 | 3/2014 | Sanchez et al. |
| 2014/0344153 A1 | 11/2014 | Raj et al. |
| 2015/0327071 A1 | 11/2015 | Sharma et al. |
| 2015/0332255 A1 | 11/2015 | Ren et al. |
| 2015/0348015 A1 | 12/2015 | Ren et al. |
| 2016/0036790 A1 | 2/2016 | Shastry et al. |
| 2016/0119296 A1 | 4/2016 | Laxminarayanan et al. |
| 2016/0210605 A1 | 7/2016 | Vaish et al. |
| 2016/0210626 A1 | 7/2016 | Ortiz et al. |
| 2016/0239817 A1 | 8/2016 | Chene |
| 2016/0247141 A1 | 8/2016 | Graylin et al. |
| 2016/0248479 A1 | 8/2016 | Bellenger et al. |
| 2017/0161843 A1 | 6/2017 | Rizzini |
| 2019/0325424 A1 | 10/2019 | Yeddula et al. |
| 2019/0349360 A1 | 11/2019 | Yeddula et al. |
| 2020/0286061 A1* | 9/2020 | Wang ................ G06Q 20/3263 |

OTHER PUBLICATIONS

Li et al., "Secure Mobile Payment via Trusted Computing", Third Asia-Pacific Trusted Infrastructure Technologies Conference, 2008, pp. 98-112.
"UL Card Simulator", UL Test Tools, pp. 1-2, Jan. 2018.

* cited by examiner

SYSTEM, METHOD AND COMPUTER PROGRAM PRODUCT FOR AUTOMATIC AND REMOTE CONTROL OF NFC TRANSACTION PROCESSING

CROSS REFERENCE TO RELATED APPLICATIONS

This application is a continuation of U.S. patent application Ser. No. 15/960,722, now U.S. Pat. No. 10,922,678, filed on Apr. 24, 2018, the disclosure of which is hereby incorporated by reference in its entirety.

BACKGROUND OF THE INVENTION

1. Field of the Invention

This invention relates generally to systems, devices, products, apparatus, and methods that are used for near-field communication (NFC) transaction processing, and in one particular embodiment, to a system, product, and method for automatic and remote control of NFC transaction processing.

2. Technical Considerations

Near-field communication (NFC) is a set of communication protocols that enable two electronic devices, at least one of which is typically a portable device (e.g., a smartphone, etc.), to establish communication by bringing the two electronic devices within a NFC range of each other (e.g., within 4 cm (1.6 in) of each other). NFC devices are used in contactless payment systems, similar to those used in credit cards and electronic ticket smartcards and allow mobile payment to replace and/or supplement conventional payment systems.

Host card emulation (HCE) is a software architecture that provides exact virtual representation of various electronic identity cards (e.g., access cards, transit cards, banking cards, etc.) using only software. For example, HCE enables a smartphone to perform card emulation on a NFC-enabled device without relying on access to a secure element.

However, conventional NFC HCE payment processing is manual, hardware intensive, requires a device to provision a token, and requires physically tapping the device onto a NFC terminal. For example, in order to initiate and/or perform an NFC HCE payment, a physical person manually touches the device to the NFC terminal or a robotic arm is used to manually touch the device to the NFC terminal. Further, multiple tokens (e.g., hundreds of tokens, thousands of tokens, etc.) for multiple payments cannot be provisioned on the device, read by the NFC terminal, and automatically provided to a payment processing network for payment processing without performing the physical tapping of the device onto the NFC terminal for each individual payment of the multiple payments. For example, conventional token-based payment processing testing uses a lab setup including extensive and specific hardware configured for the device and NFC terminal to perform the physical tapping and communicate with the payment processing network (e.g., an acquirer system, a payment gateway, a transaction service provider system, an issuer system, etc.), or relies on simulators that simulate token processing in a simulated payment processing network using mock data (e.g., without communicating with an actual payment processing network including an acquirer system, a payment gateway, a transaction service provider system, an issuer system, and/or the like).

Moreover, conventional token-based payment processing testing does not allow for remote access to the device and/or the NFC terminal for performing remote testing of token-based payment processing in the payment processing network. For example, a remote tester cannot remotely access the device and NFC terminal to automatically process token-based payments between the device and the NFC terminal with the payment processing network.

SUMMARY OF THE INVENTION

Accordingly, provided are improved systems, devices, products, apparatus, and/or methods for automatic and remote control of NFC transaction processing.

According to a non-limiting embodiment or aspect, provided is a method for automatic and remote control of near-field communication (NFC) transaction processing, the method comprising: receiving, with a first device, transaction data associated with a transaction, wherein the first device and a second device are located within a NFC range of each other; automatically requesting, with the first device, a token associated with the transaction from a transaction processing network in response to receiving the transaction data; receiving, with the first device, the token from the transaction processing network; automatically and wirelessly transmitting, with the first device, the token to the second device via NFC in response to receiving the token from the transaction processing network; receiving, with the second device, the token from the first device via NFC; automatically transmitting, with the second device, the token to the transaction processing network in response to receiving the token from the first device; receiving, with the second device, an authorization response associated with the transaction from the transaction processing network; and determining, with at least one processor, a compatibility of at least one application associated with at least one of the first device and the second device with the transaction processing network based on the authorization response.

In some non-limiting embodiments or aspects, the method further comprises receiving, with the first device, the at least one application from a remote device; installing, with the first device, the at least one application on the first device; and providing, with the first device, the transaction data to the first device using the at least one application, wherein determining the compatibility comprises determining a compatibility of using the at least one application on the first device with the transaction processing network.

In some non-limiting embodiments or aspects, the at least one application comprises an electronic wallet application.

In some non-limiting embodiments or aspects, the method further comprises receiving, with the second device, the at least one application from a remote device; installing, with the second device, the at least one application on the second device; and controlling, with the second device, receipt of the token from the first device via NFC using the at least one application, wherein determining the compatibility comprises determining a compatibility of using the at least one application on the second device with the transaction processing network.

In some non-limiting embodiments or aspects, the at least one application comprises a point-of-sale application programmed or configured to receive, process, and provide data associated with conducting the transaction.

In some non-limiting embodiments or aspects, the method further comprises receiving, with the first device, the transaction data from the at least one application, wherein the at least one application is installed on a remote device.

In some non-limiting embodiments or aspects, the transaction data is associated with a plurality of transactions, and the method further comprises: automatically requesting, with the first device, a plurality of tokens associated with the plurality of transactions from the transaction processing network in response to receiving the transaction data; and substantially simultaneously receiving, with the second device, the plurality of tokens from the first device.

According to a non-limiting embodiment or aspect, provided is a system for automatic and remote control of near-field communication (NFC) transaction processing comprising: a testing system remotely accessible by a remote device via a communication network, the testing system comprising a first device and a second device located within a NFC range of each other, wherein the first device is programmed or configured to: receive transaction data associated with a transaction from the remote device via the communication network; automatically request a token associated with the transaction from a transaction processing network in response to receiving the transaction data; receive the token from the transaction processing network; and automatically and wirelessly transmit the token to the second device via NFC in response to receiving the token from the transaction processing network, and wherein the second device is programmed or configured to: receive, the token from the first device via NFC; automatically transmit the token to the transaction processing network in response to receiving the token from the first device; and receive an authorization response associated with the transaction from the transaction processing network; and at least one processor programmed or configured to determine a compatibility of at least one application associated with at least one of the first device and the second device with the transaction processing network based on the authorization response.

In some non-limiting embodiments or aspects, the first device is further programmed or configured to: receive the at least one application from the remote device; install the at least one application on the first device; and provide the transaction data to the first device using the at least one application, and the at least one processor is further programmed or configured to determine the compatibility by determining a compatibility of using the at least one application on the first device with the transaction processing network.

In some non-limiting embodiments or aspects, the at least one application comprises an electronic wallet application.

In some non-limiting embodiments or aspects, the second device is further programmed or configured to: receive the at least one application from the remote device; install the at least one application on the second device; and control receipt of the token from the first device via NFC using the at least one application, and wherein the at least one processor is further programmed or configured to determine the compatibility by determining a compatibility of using the at least one application on the second device with the transaction processing network.

In some non-limiting embodiments or aspects, the at least one application comprises a point-of-sale application programmed or configured to receive, process, and provide data associated with conducting the transaction.

In some non-limiting embodiments or aspects, the first device is further programmed or configured to receive the transaction data from the at least one application, and the at least one application is installed on the remote device.

In some non-limiting embodiments or aspects, the transaction data is associated with a plurality of transactions, the first device is further programmed or configured to automatically request a plurality of tokens associated with the plurality of transactions from the transaction processing network in response to receiving the transaction data, and the second device is further programmed or configured to substantially simultaneously receive the plurality of tokens from the first device.

In some non-limiting embodiments or aspects, the at least one processor is further programmed or configured to provide data associated with the compatibility of the at least one application to the remote communication device via the communication network, and the data comprises an indication of whether the transaction is successfully processed by the transaction processing network.

According to a non-limiting embodiment or aspect, provided is a computer program product for automatic and remote control of near-field communication (NFC) transaction processing, the computer program product comprising at least one non-transitory computer-readable medium comprising one or more instructions that, when executed by at least one processor, cause the at least one processor to: control a first device to receive transaction data associated with a transaction, wherein the first device and a second device are located within a NFC range of each other; control the first device to automatically request a token associated with the transaction from a transaction processing network in response to receiving the transaction data; control the first device to receive the token from the transaction processing network; control the first device to automatically and wirelessly transmit the token to the second device via NFC in response to receiving the token from the transaction processing network; control the second device to receive the token from the first device; control the second device to automatically transmit the token to the transaction processing network in response to receiving the token from the first device; control the second device to receive an authorization response associated with the transaction from the transaction processing network; and determine a compatibility of at least one application associated with at least one of the first device and the second device with the transaction processing network based on the authorization response.

In some non-limiting embodiments or aspects, the one or more instructions further cause the at least one processor to: control the first device to receive the at least one application from a remote device; control the first device to install the at least one application on the first device; and control the first device to provide the transaction data to the first device using the at least one application, and determine the compatibility by determining a compatibility of using the at least one application on the first device with the transaction processing network.

In some non-limiting embodiments or aspects, the at least one application comprises an electronic wallet application.

In some non-limiting embodiments or aspects, the one or more instructions further cause the at least one processor to: control the second device to receive the at least one application from a remote device; control the second device to install the at least one application on the second device; and control the second device to receive the token from the first device via NFC using the at least one application, and determine the compatibility by determining a compatibility of using the at least one application on the second device with the transaction processing network.

In some non-limiting embodiments or aspects, the at least one application comprises a point-of-sale application programmed or configured to receive, process, and provide data associated with conducting the transaction.

Further embodiments or aspects are set forth in the following numbered clauses:

Clause 1: A method for automatic and remote control of near-field communication (NFC) transaction processing, the method comprising: receiving, with a first device, transaction data associated with a transaction, wherein the first device and a second device are located within a NFC range of each other; automatically requesting, with the first device, a token associated with the transaction from a transaction processing network in response to receiving the transaction data; receiving, with the first device, the token from the transaction processing network; automatically and wirelessly transmitting, with the first device, the token to the second device via NFC in response to receiving the token from the transaction processing network; receiving, with the second device, the token from the first device via NFC; automatically transmitting, with the second device, the token to the transaction processing network in response to receiving the token from the first device; receiving, with the second device, an authorization response associated with the transaction from the transaction processing network; and determining, with at least one processor, a compatibility of at least one application associated with at least one of the first device and the second device with the transaction processing network based on the authorization response.

Clause 2: The method of clause 1, further comprising: receiving, with the first device, the at least one application from a remote device; installing, with the first device, the at least one application on the first device; and providing, with the first device, the transaction data to the first device using the at least one application, wherein determining the compatibility comprises determining a compatibility of using the at least one application on the first device with the transaction processing network.

Clause 3: The method of any of clauses 1 and 2, wherein the at least one application comprises an electronic wallet application.

Clause 4: The method of any of clauses 1-3, further comprising: receiving, with the second device, the at least one application from a remote device; installing, with the second device, the at least one application on the second device; and controlling, with the second device, receipt of the token from the first device via NFC using the at least one application, wherein determining the compatibility comprises determining a compatibility of using the at least one application on the second device with the transaction processing network.

Clause 5: The method of any of clauses 1-4, wherein the at least one application comprises a point-of-sale application programmed or configured to receive, process, and provide data associated with conducting the transaction.

Clause 6: The method of any of clauses 1-5, further comprising receiving, with the first device, the transaction data from the at least one application, wherein the at least one application is installed on a remote device.

Clause 7: The method of any of clauses 1-6, wherein the transaction data is associated with a plurality of transactions, the method further comprising: automatically requesting, with the first device, a plurality of tokens associated with the plurality of transactions from the transaction processing network in response to receiving the transaction data; and substantially simultaneously receiving, with the second device, the plurality of tokens from the first device.

Clause 8: A system for automatic and remote control of near-field communication (NFC) transaction processing comprising: a testing system remotely accessible by a remote device via a communication network, the testing system comprising a first device and a second device located within a NFC range of each other, wherein the first device is programmed or configured to: receive transaction data associated with a transaction from the remote device via the communication network; automatically request a token associated with the transaction from a transaction processing network in response to receiving the transaction data; receive the token from the transaction processing network; and automatically and wirelessly transmit the token to the second device via NFC in response to receiving the token from the transaction processing network, and wherein the second device is programmed or configured to: receive, the token from the first device via NFC; automatically transmit the token to the transaction processing network in response to receiving the token from the first device; and receive an authorization response associated with the transaction from the transaction processing network; and at least one processor programmed or configured to determine a compatibility of at least one application associated with at least one of the first device and the second device with the transaction processing network based on the authorization response.

Clause 9: The system of clause 8, wherein the first device is further programmed or configured to: receive the at least one application from the remote device; install the at least one application on the first device; and provide the transaction data to the first device using the at least one application, and wherein the at least one processor is further programmed or configured to determine the compatibility by determining a compatibility of using the at least one application on the first device with the transaction processing network.

Clause 10: The system of any of clauses 8 and 9, wherein the at least one application comprises an electronic wallet application.

Clause 11: The system of any of clauses 8-10, wherein the second device is further programmed or configured to: receive the at least one application from the remote device; install the at least one application on the second device; and control receipt of the token from the first device via NFC using the at least one application, and wherein the at least one processor is further programmed or configured to determine the compatibility by determining a compatibility of using the at least one application on the second device with the transaction processing network.

Clause 12: The system of any of clauses 8-11, wherein the at least one application comprises a point-of-sale application programmed or configured to receive, process, and provide data associated with conducting the transaction.

Clause 13: The system of any of clauses 8-12, wherein the first device is further programmed or configured to receive the transaction data from the at least one application, and wherein the at least one application is installed on the remote device.

Clause 14: The system of any of clauses 8-13, wherein the transaction data is associated with a plurality of transactions, wherein the first device is further programmed or configured to automatically request a plurality of tokens associated with the plurality of transactions from the transaction processing network in response to receiving the transaction data, and wherein the second device is further programmed or configured to substantially simultaneously receive the plurality of tokens from the first device.

Clause 15: The system of any of clauses 8-14, wherein the at least one processor is further programmed or configured to provide data associated with the compatibility of the at least one application to the remote communication device via the communication network, and wherein the data comprises an indication of whether the transaction is successfully processed by the transaction processing network.

Clause 16: A computer program product for automatic and remote control of near-field communication (NFC) transaction processing, the computer program product comprising at least one non-transitory computer-readable medium comprising one or more instructions that, when executed by at least one processor, cause the at least one processor to: control a first device to receive transaction data associated with a transaction, wherein the first device and a second device are located within a NFC range of each other; control the first device to automatically request a token associated with the transaction from a transaction processing network in response to receiving the transaction data; control the first device to receive the token from the transaction processing network; control the first device to automatically and wirelessly transmit the token to the second device via NFC in response to receiving the token from the transaction processing network; control the second device to receive the token from the first device; control the second device to automatically transmit the token to the transaction processing network in response to receiving the token from the first device; control the second device to receive an authorization response associated with the transaction from the transaction processing network; and determine a compatibility of at least one application associated with at least one of the first device and the second device with the transaction processing network based on the authorization response.

Clause 17: The computer program product of clause 16, wherein the one or more instructions further cause the at least one processor to: control the first device to receive the at least one application from a remote device; control the first device to install the at least one application on the first device; control the first device to provide the transaction data to the first device using the at least one application; and determine the compatibility by determining a compatibility of using the at least one application on the first device with the transaction processing network.

Clause 18: The computer program product of any of clauses 16 and 17, wherein the at least one application comprises an electronic wallet application.

Clause 19: The computer program product of any of clauses 16-18, wherein the one or more instructions further cause the at least one processor to: control the second device to receive the at least one application from a remote device; control the second device to install the at least one application on the second device; control the second device to receive the token from the first device via NFC using the at least one application; and determine the compatibility by determining a compatibility of using the at least one application on the second device with the transaction processing network.

Clause 20: The computer program product of any of clauses 16-19 wherein the at least one application comprises a point-of-sale application programmed or configured to receive, process, and provide data associated with conducting the transaction.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments or aspects that are illustrated in the accompanying schematic figures, in which.

DESCRIPTION OF THE INVENTION

Figure 1:
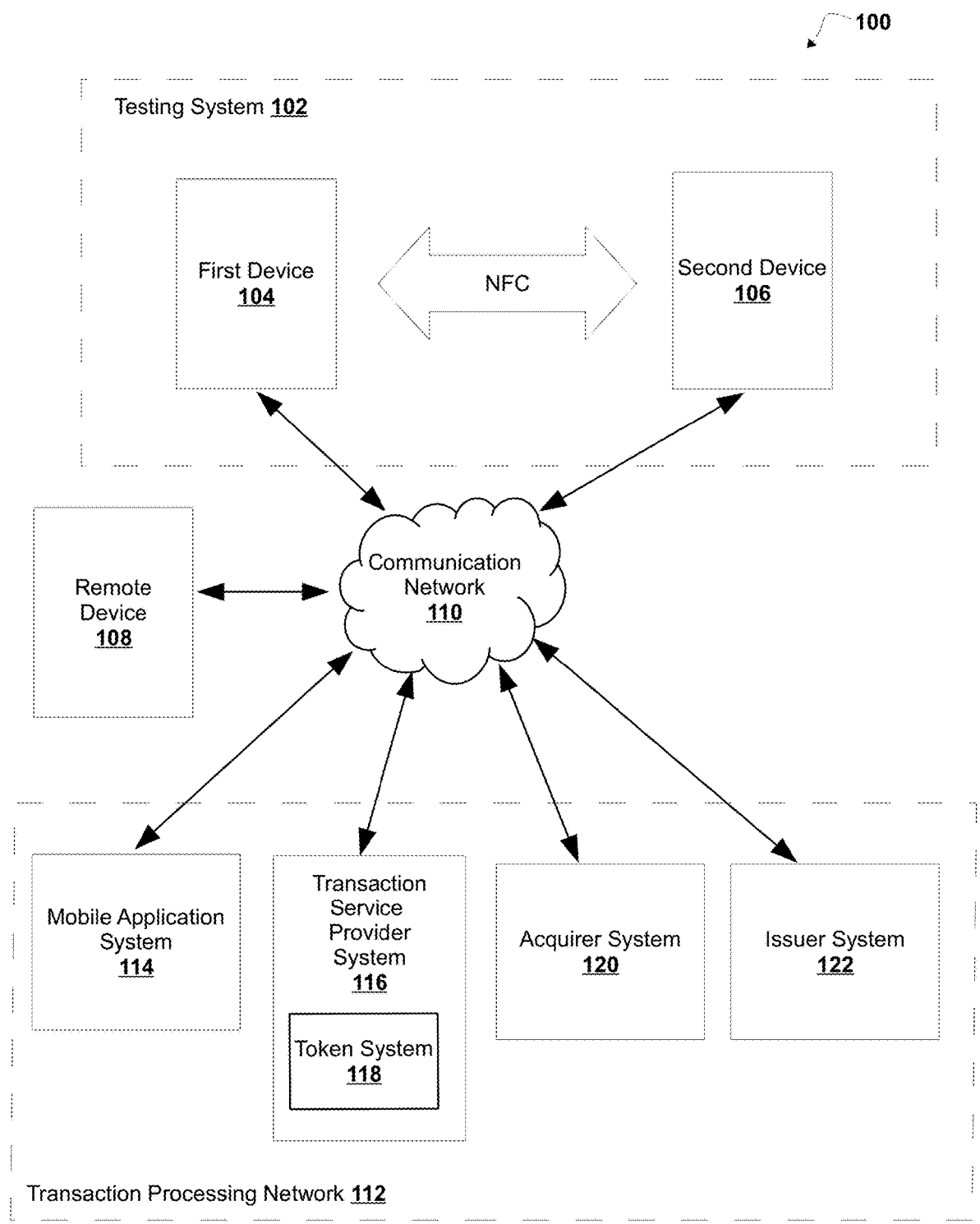
FIG. 1 is a diagram of a non-limiting embodiment or aspect of an environment in which systems, devices, products, apparatus, and/or methods, described herein, may be implemented according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible. It will be appreciated that numerous other arrangements are possible.

As used herein, the terms "issuer institution," "portable financial device issuer," "issuer," or "issuer bank" may refer to one or more entities that provide one or more accounts to a user (e.g., customer, consumer, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "account identifier" may refer to one or more types of identifiers associated with a user account (e.g., an account identifier, a PAN, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial device, a payment card, a credit card, a debit card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user.

In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifier in one or more data structures (e.g., one or more databases and/or the like) such that they may be used to conduct a transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "token issuer" may refer to one or more entities that generate, process, and maintain tokens. As used herein "token issuer system" may refer to one or more computer systems operated by or on behalf of a token issuer, such as a server executing one or more software applications. For example, a token issuer system may include or be in communication with a token vault where generated tokens are stored. As an example, the token vault may maintain a mapping between a token and a primary account number (PAN) represented by a token.

As used herein, the term "merchant" may refer to one or more entities (e.g., operators of retail businesses) that provide goods and/or services, and/or access to goods and/or services, to a user based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like. As an example, a POS device may use a POS application installed on the POS device to receive, process, and/or provide data associated with conducting the transaction and/or processing the transaction.

As used herein, a "POS system" may refer to one or more computers and/or peripheral devices used by a merchant to conduct a transaction. For example, a POS system may include one or more POS devices, and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "portable financial device" may refer to a payment card (e.g., a credit card, a debit card, an ATM card, and/or the like), a gift card, a smartcard, a payroll card, a healthcare card, a loyalty card, a merchant discount card, a security card, an access card, and/or the like. The portable financial device may include volatile or non-volatile memory to store information (e.g., an account identifier, a name of the account holder, and/or the like).

As used herein, the terms "client" and "client device" may refer to one or more client-side devices or systems, remote from a transaction service provider, used to initiate or facilitate a transaction. As an example, a "client device" may refer to one or more POS devices and/or POS systems used by a merchant. In some non-limiting embodiments or aspects, a client device may be any electronic device configured to communicate with one or more networks and initiate or facilitate transactions such as, but not limited to, one or more computers, portable computers (e.g., tablet computers), mobile devices (e.g., cellular phones, smartphones, wearable devices, such as watches, glasses, lenses, and/or clothing, PDAs, and/or the like), and/or other like devices. Moreover, a "client" may also refer to an entity, such as a merchant, that owns, utilizes, and/or operates a client device for initiating transactions with a transaction service provider.

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "originator" may refer to an entity that offers OCT, AFT, multi-OCT, multi-AFT, or some combination thereof services to its consumers. Originator may also refer to one or more computer systems operated by or on behalf of an originator. The originator may be a merchant, as defined above. In addition to being a merchant, the originator may or may not also be an acquirer of the transaction service provider. If the originator is not also an acquirer associated with the transaction service provider, the originator may be sponsored by an acquirer associated with the transaction service provider.

As used herein, the term "payment gateway" may refer to a payment processing system operated by or on behalf of an entity that contracts with an acquirer institution to provide transaction service provider payment services to one or more merchants using portable financial devices managed by the transaction service provider.

As used herein, the term "payment facilitator" may refer to a payment processing system operated by or on behalf of an entity that contracts with an acquirer to provide transaction service provider payment services using portable financial devices of the transaction service provider to merchants sponsored by the payment facilitator. A payment facilitator may also refer to the entity that operates such a payment processing system. The payment facilitator may execute a merchant acceptance agreement on behalf of an acquirer and/or receive settlement of transaction proceeds from an acquirer on behalf of a sponsored merchant. The payment facilitator may monitor all of its sponsored merchant activity in accordance with regulations of the transaction service provider.

Non-limiting embodiments or aspects of the present invention are directed to systems, methods and computer program products for automatic and remote control of near-field communication (NFC) transaction processing. In some non-limiting embodiments or aspects, a method may include receiving transaction data associated with a transaction, automatically requesting a token associated with the transaction from a transaction processing network in response to receiving the transaction data, receiving the token from the transaction processing network, automatically and wirelessly transmitting the token from a first device to a second device via NFC in response to receiving the token from the transaction processing network, automatically transmitting the token to the transaction processing network in response to receiving the token from the first device, receiving an authorization response associated with the transaction from the transaction processing network, and determining a compatibility of an application associated with at least one of the first device and the second device with the transaction processing network based on the authorization response.

In this way, embodiments or aspects of the present invention may reduce or eliminate a hardware dependency on physically tapping devices and/or on physical procurement of specific devices or hardware to test those specific devices or hardware, enable automatic end-to-end processing of transactions, and/or provides for remote access to a testing system (e.g., two devices in located within a NFC range of each other) for provisioning and processing transactions with the transaction processing network that enables a remote user to execute an end-to-end transaction flow using the two devices for transaction processing testing with the transaction processing network as though the remote user has the devices in hand. Accordingly, processing of transactions can be more automatic, more accessible to remote users for remotely testing applications (e.g., electronic wallet applications, POS terminal application, etc.), and/or increase a processing speed of a testing system for processing token-based transactions.

Referring now to FIG. 1, FIG. 1 is a diagram of an example environment 100 in which devices, systems, and/or methods, described herein, may be implemented. As shown in FIG. 1, environment 100 includes testing system 102 including first device 104 and/or second device 106, remote device 108, communication network 110, and/or transaction processing network 112 including mobile application system 114, transaction service provider system 116, token system 118, acquirer system 120, and/or issuer system 122. Testing system 102 including first device 104 and/or second device 106, remote device 108, communication network 110, and/or transaction processing network 112 including mobile application system 114, transaction service provider system 116, token system 118, acquirer system 120, and/or issuer system 122 may interconnect (e.g., establish a connection to communicate) via wired connections, wireless connections, or a combination of wired and wireless connections.

Testing system 102 may include first device 104 and second device 106 located within a short range wireless communication connection range of each other. For example, testing system 102 may include first device 104 and second device 106 located within a NFC range of each other. As an example, testing system 102 can include first device 104 and second device 106 spaced apart (e.g. permanently spaced apart, etc.) from each other at a testing location. In some non-limiting embodiments or aspects, the testing location and testing system 102 can be remote from and/or external to remote device 108 and/or transaction processing network 112.

First device 104 (e.g., a user device, a client device, a POS device, etc.) may include one or more devices capable of receiving information from and/or communicating information to second device 106, remote device 108, and/or transaction processing network 112 including mobile application system 114, transaction service provider system 116, token system 118, acquirer system 120, and/or issuer system 122 via communication network 110. For example, first device 104 may include one or more devices capable of receiving information from and/or communicating information to second device 106 via a short range wireless communication connection (e.g., an NFC communication connection, an RFID communication connection, a Bluetooth® communication connection, and/or the like). As an example, first device 104 may include one or more devices capable of receiving information from and/or communicating information to remote device 108 and/or transaction processing network 112 including mobile application system 114, transaction service provider system 116, token system 118, acquirer system 120, and/or issuer system 122 via communication network 110. In some non-limiting embodiments or aspects, first device 104 may include an application associated with first device 104, such as an application stored on first device 104, a mobile application (e.g., a mobile device application, a native application for a mobile device, a mobile cloud application for a mobile device, and/or the like) stored on first device 104, and/or the like.

Second device 106 (e.g., a user device, a client device, a POS device, etc.) may include one or more devices capable of receiving information from and/or communicating information to first device 104, remote device 108, and/or transaction processing network 112 including mobile application system 114, transaction service provider system 116, token system 118, acquirer system 120, and/or issuer system 122 via communication network 110. For example, second device 106 may include one or more devices capable of receiving information from and/or communicating information to first device 104 via a short range wireless communication connection (e.g., an NFC communication connection, an RFID communication connection, a Bluetooth® communication connection, and/or the like). As an example, first device 104 may include one or more devices capable of receiving information from and/or communicating information to remote device 108 and/or transaction processing network 112 including mobile application system 114, transaction service provider system 116, token system 118, acquirer system 120, and/or issuer system 122 via communication network 110. In some non-limiting embodiments or aspects, second device 106 may include an application associated with second device 106, such as an application stored on second device 106, a mobile application (e.g., a mobile device application, a native application for a mobile device, a mobile cloud application for a mobile device, and/or the like) stored on second device 106, and/or the like.

In some non-limiting embodiments or aspects, second device 106 includes a merchant system. For example, the merchant system may be associated with a merchant as described herein. As an example, second device 106 may enable a merchant to communicate information to transaction service provider system 116. In some non-limiting embodiments or aspects, second device 106 may include one or more devices, such as computers, computer systems, and/or peripheral devices capable of being used by a merchant to conduct a payment transaction with a user. For example, second device 106 may include a POS device and/or a POS system.

In some non-limiting embodiments or aspects, testing system 102 may include one or more other devices (not shown) capable of receiving information from first device 104, second device 106, remote device 108, and/or transaction processing network 112 including mobile application system 114, transaction service provider system 116, token system 118, acquirer system 120, and/or issuer system 122 via communication network 110 and/or communicating information to first device 104, second device 106, remote device 108, communication network 110, and/or transaction processing network 112 including mobile application system 114, transaction service provider system 116, token system 118, acquirer system 120, and/or issuer system 122 via network 110. For example, testing system 102 may include a computing device, such as a server (e.g., a testing server), a group of servers, and/or other like devices. As an example, testing system 102 may include one or more other devices programmed or configured to control one or more operations or functions (e.g., transmitting, receiving, processing, etc.) of first device 104 and/or second device 106.

Remote device 108 (e.g., a server, a user device, a client device, a POS device, etc.) may include one or more devices capable of receiving information from and/or communicating information to first device 104, second device 106, and/or transaction processing network 112 including mobile application system 114, transaction service provider system 116, token system 118, acquirer system 120, and/or issuer system 122 via communication network 110. In some non-limiting embodiments or aspects, remote device 108 may include an application associated with remote device 108, such as an application stored on remote device 108, a mobile application (e.g., a mobile device application, a native application for a mobile device, a mobile cloud application for a mobile device, and/or the like) stored on remote device 108, and/or the like.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Mobile application system 114 may include one or more devices capable of receiving information from testing system 102 including first device 104 and/or second device 106, remote device 108, transaction service provider system 116, token system 118, acquirer system 120, and/or issuer system 122 via communication network 110 and/or communicating information to testing system 102 including first device 104 and/or second device 106, remote device 108, transaction service provider system 116, token system 118, acquirer system 120, and/or issuer system 122 via communication network 110. For example, mobile application system 114 may include a computing device, such as a server, a group of servers, and/or other like devices operated by or on behalf of an application provider that provides and/or maintains an application for a user on a user device (e.g., a customer). For example, the user device (e.g., a mobile device) can execute an application program, and server-side software and/or databases can maintain and provide data associated with the application to the user device and/or transaction processing network 112. In some non-limiting embodiments or aspects, mobile application system 114 may be associated with an electronic wallet provider and/or an electronic wallet provider system as described herein.

Transaction service provider system 116 may include one or more devices capable of receiving information from testing system 102 including first device 104 and/or second device 106, remote device 108, mobile application system 114, token system 118, acquirer system 120, and/or issuer system 122 via communication network 110 and/or communicating information to testing system 102 including first device 104 and/or second device 106, remote device 108, mobile application system 114, token system 118, acquirer system 120, and/or issuer system 122 via communication network 110. For example, transaction service provider system 116 may include a computing device, such as a server (e.g., a transaction processing server), a group of servers, and/or other like devices. In some non-limiting embodiments or aspects, transaction service provider system 116 may be associated with a transaction service provider as described herein. In some non-limiting embodiments or aspects, transaction service provider system 116 may be in communication with a data storage device, which may be local or remote to the transaction service provider system 116. In some non-limiting embodiments or aspects, transaction service provider system 116 may be capable of receiving information from, storing information in, communicating information to, or searching information stored in data storage device.

Token system 118 may include one or more devices capable of receiving information from testing system 102 including first device 104 and/or second device 106, remote device 108, mobile application system 114, transaction service provider system 116, acquirer system 120, and/or issuer system 122 via communication network 110 and/or communicating information to testing system 102 including first device 104 and/or second device 106, remote device 108, mobile application system 114, transaction service provider system 116, acquirer system 120, and/or issuer system 122 via communication network 110. For example, token system 118 may include a computing device, such as a server (e.g., a transaction processing server), a group of servers, and/or other like devices. In some non-limiting embodiments or aspects, token system 118 may be associated with a token issuer as described herein. In some non-limiting embodiments or aspects, token system 118 may be implemented in transaction service provider system 116 as shown in FIG. 1, or as a separate system separate from transaction service provider system 116.

Acquirer system 120 may include one or more devices capable of receiving information from testing system 102 including first device 104 and/or second device 106, remote device 108, mobile application system 114, transaction service provider system 116, token system 118, and/or issuer system 122 via communication network 110 and/or communicating information to testing system 102 including first device 104 and/or second device 106, remote device 108, mobile application system 114, transaction service provider system 116, token system 118, and/or issuer system 122 via communication network 110. For example, token system 118 may include a computing device, such as a server, a group of servers, and/or other like devices. In some non-limiting embodiments or aspects, acquirer system 120 may be associated with one or more of an acquirer, an originator, a payment gateway, and/or a payment facilitator, as described herein.

Issuer system 122 may include one or more devices capable of receiving information from testing system 102 including first device 104 and/or second device 106, remote device 108, mobile application system 114, transaction service provider system 116, token system 118, and/or acquirer system 120 via communication network 110 and/or communicating information to testing system 102 including first device 104 and/or second device 106, remote device 108, mobile application system 114, transaction service provider system 116, token system 118, and/or acquirer system 120 via communication network 110. For example, issuer system 122 may include a computing device, such as a server, a group of servers, and/or other like devices. In some non-limiting embodiments or aspects, issuer system 122 may be associated with an issuer institution as described herein. For example, issuer system 122 may be associated with an issuer institution that issued a credit account, debit account, credit card, debit card, and/or the like to a user associated with a user device.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
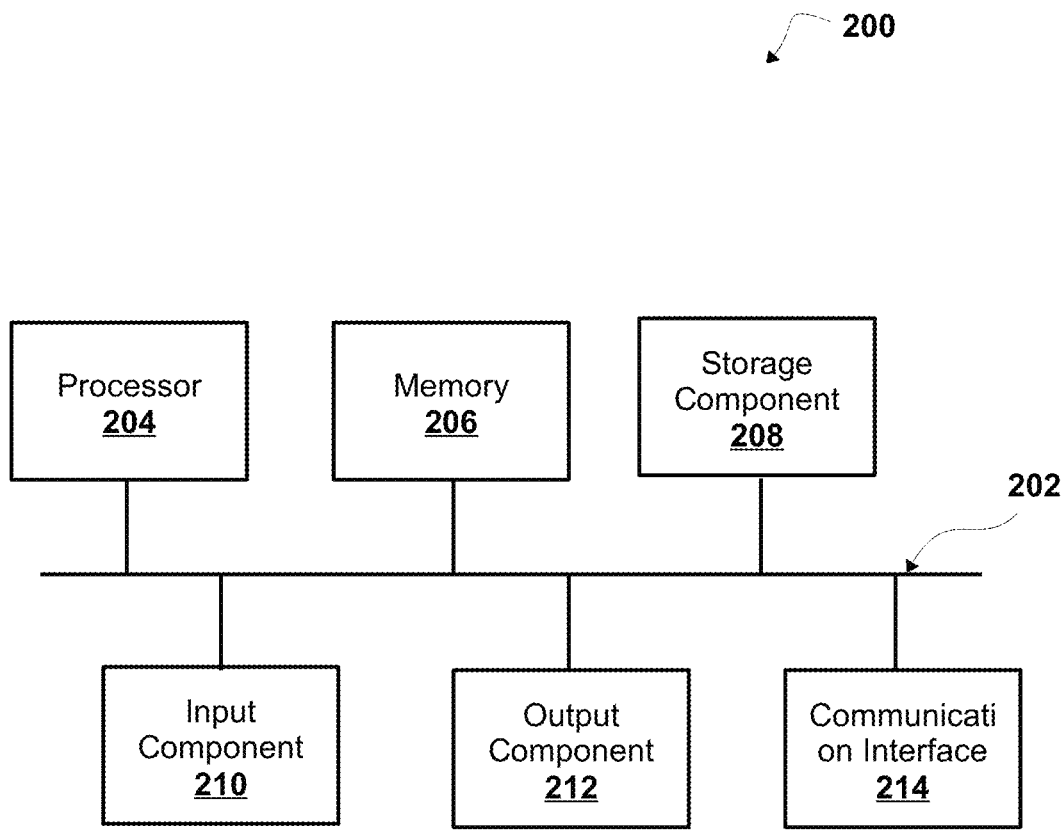
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of testing system 102, first device 103, second device 106, remote device 108, one or more devices of transaction processing network 112, one or more devices of mobile application system 114, one or more devices of transaction service provider system 116, one or more devices of token system 118, one or more devices of acquirer system 120, and/or more or more devices of issuer system 122. In some non-limiting embodiments or aspects, testing system 102, first device 104, second device 106, remote device 108, one or more devices of testing system 102, first device 104, second device 106, remote device 108, one or more devices of transaction processing network 112, one or more devices of mobile application system 114, one or more devices of transaction service provider system 116, one or more devices of token system 118, one or more devices of acquirer system 120, and/or more or more devices of issuer system 122 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
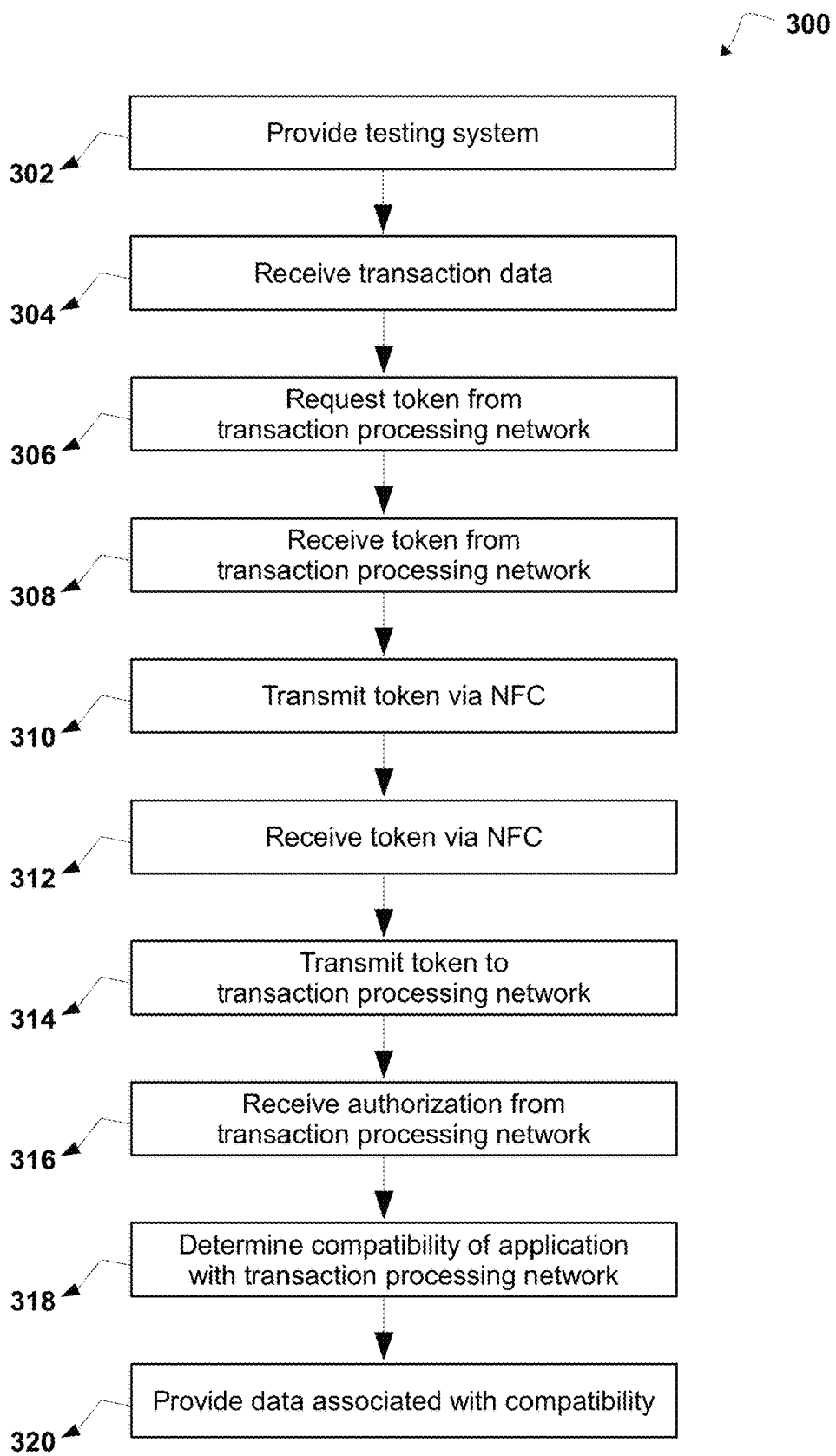
FIG. 3 is a flowchart of a non-limiting embodiment or aspect of a process for automatic and remote control of near-field communication (NFC) transaction processing.

Referring now to FIG. 3, FIG. 3 is a flowchart of a non-limiting embodiment or aspect of a process 300 for automatic and remote control of NFC transaction processing. In some non-limiting embodiments or aspects, one or more of the steps of process 300 may be performed (e.g., completely, partially, etc.) by testing system 102 (e.g., one or more devices of testing system 102, such as, first device 104, second device 106, one or more other devices, and/or the like). In some non-limiting embodiments or aspects, one or more of the steps of process 300 may be performed (e.g., completely, partially, etc.) by another device or a group of devices separate from or including testing system 102, such as remote device 108, transaction processing network 112 (e.g., one or more devices of transaction processing network 112), mobile application system 114 (e.g., one or more devices of mobile application system 114), transaction service provider system (e.g., one or more devices of transaction service provider system 116), token system 118 (e.g., one or more devices of token system 118), acquirer system (e.g., one or more devices of acquirer system 120), and/or issuer system 122 (e.g., more or more devices of issuer system 122).

As shown in FIG. 3, at step 302, process 300 includes providing a testing system remotely accessible by a remote device via a communications network, the testing system including a first device and a second device located within a NFC range of each other. For example, testing system 102 includes first device 104 and second device 106 located within a NFC range of each other. As an example, testing system 102 (e.g., first device 104, second device 106, one or more other devices, etc.) can be accessed by remote device 108 via communication network 110.

In some non-limiting embodiments or aspects, at least one of first device 104 and second device 106 is associated with at least one application. For example, first device 104 can be associated with an electronic wallet application. As an example, second device 106 can be associated with a POS application. In some non-limiting embodiments or aspects, first device 104 is associated with an internet-of-things (IOT) application that includes a payment solution.

In some non-limiting embodiments or aspects, first device 104 includes a first type of mobile device, second device 106 (and/or remote device 108) includes a second type of mobile device, and the first type of mobile device is different than the second type of mobile device. For example, a type of a mobile device may include one or more of the following: an operating system of the mobile device (e.g., Google's Android®, Apple's iOS®, etc.), an operating system version of the mobile device (e.g., Apple's iOS® 9.0, 11.3, etc.), a hardware architecture of the mobile device (e.g., processor type, NFC radio type, etc.), an application type (e.g., an electronic wallet application type or version, a POS application type or version, etc.), and/or the like.

In some non-limiting embodiments or aspects, the application is programmed or configured for one of the first type of mobile device and the second type of mobile device, and the application is not programmed or configured for the other of the first type of mobile device and the second type of mobile device (e.g., cannot be installed, initiated, and/or executed by the other of the first type of mobile device and the second type of mobile device).

As further shown in FIG. 3, at step 304, process 300 includes receiving transaction data associated with a transaction. For example, testing system 102 can control first device 104 to receive transaction data associated with a transaction. As an example, first device 104 can receive transaction data associated with a transaction.

In some non-limiting embodiments or aspects, transaction data may include transaction parameters associated with transactions, such as payment transactions initiated and/or conducted with an electronic wallet application, and/or the like. Non-limiting examples of transaction parameters include: electronic wallet card data, PAN, transaction amount, transaction date and time, conversion rate of currency, merchant type, acquiring institution country, PAN country, response code, merchant name/location, type of currency, and/or the like. Response code may refer to a successful approval/completion of a transaction, denial because card reported as lost or stolen, do not honor, partial approval, VIP approval (VIP program), amount exceeds maximum, insufficient funds, incorrect PIN, suspected fraud, activity amount exceeded, allowable number of PIN-entry tries exceeded, and/or the like.

In some non-limiting embodiments or aspects, electronic wallet card data includes one or more of data associated with an identifier regarding a portable financial device to be provided to an electronic wallet application, data associated with an identifier of an issuer associated with the portable financial device to be provided to an electronic wallet application, data associated with an identifier of a transaction service provider associated with the portable financial device to be provided to an electronic wallet application, data associated with a name of a user associated with the portable financial device to be provided to an electronic wallet application, data associated with an account identifier of an account associated with the portable financial device to be provided to an electronic wallet application, and/or the like. In some non-limiting embodiments or aspects, first device 104 may store electronic wallet card data associated with the portable financial device in the electronic wallet application.

In some non-limiting embodiments or aspects, testing system 102 receives the transaction data associated with the transaction from remote device 108 via communication network 110. In some non-limiting embodiments or aspects, first device 104 receives the transaction data from remote device 108 via communication network 110 and/or second device 106 via NFC.

In some non-limiting embodiments or aspects, first device 104 receives the application from remote device 108, installs the application on first device 104, and provides the transaction data to first device 104 using the application (e.g., implementing the application, initiating the application, executing the application, receiving, processing, and/or providing, with the application, data associated with a transaction, etc.). For example, an electronic wallet application installed on first device 104 can receive (e.g., from remote device 108) or include automated scripts for provisioning tokens (e.g., host card emulation (HCE) tokens) for account identifiers (e.g., PANs) associated with transactions and/or automated scripts for transmitting the tokens via NFC to second device 106. As an example, remote device 108 can remotely control first device 104 by transmitting a command (e.g., via a text message, etc.) to first device 104 to initiate or execute the automated scripts for provisioning (e.g., requesting the tokens, receiving the tokens, providing the tokens, etc.).

In some non-limiting embodiments or aspects, first device 104 receives the transaction data from the application, and the application is installed on remote device 108. For example, an electronic wallet application installed on remote device 108 can receive (e.g., from first device 104) or include automated scripts for provisioning tokens (e.g., host card emulation (HCE) tokens) for account identifiers (e.g., PANs) associated with transactions, and provide the tokens to first device 104 via communication network 110 for transaction processing with second device 106 and transaction processing network 112.

In some non-limiting embodiments or aspects, first device 104 receives the transaction data from second device 106, and the application is installed on second device 106. For example, a POS application installed second device 106 can receive (e.g., from remote device 108) or include automated scripts for generating transaction data associated with a transaction, providing the transaction data to first device 104, and receiving or reading the tokens (e.g., the HCE tokens) for the account identifiers (e.g., PANs) associated with the transactions that are provisioned by the electronic wallet application and/or automated scrips for transmitting the tokens to transaction processing network 112.

As further shown in FIG. 3, at step 306, process 300 includes automatically requesting a token associated with the transaction from a transaction processing network in response to receiving the transaction data. For example, testing system 102 (e.g., one or more devices of testing system 102) can control first device 104 to automatically request a token associated with the transaction from transaction processing network 112 in response to receiving the transaction data. As an example, first device 104 can automatically request a token associated with the transaction from transaction processing network 112 in response to receiving the transaction data.

Figure 4:
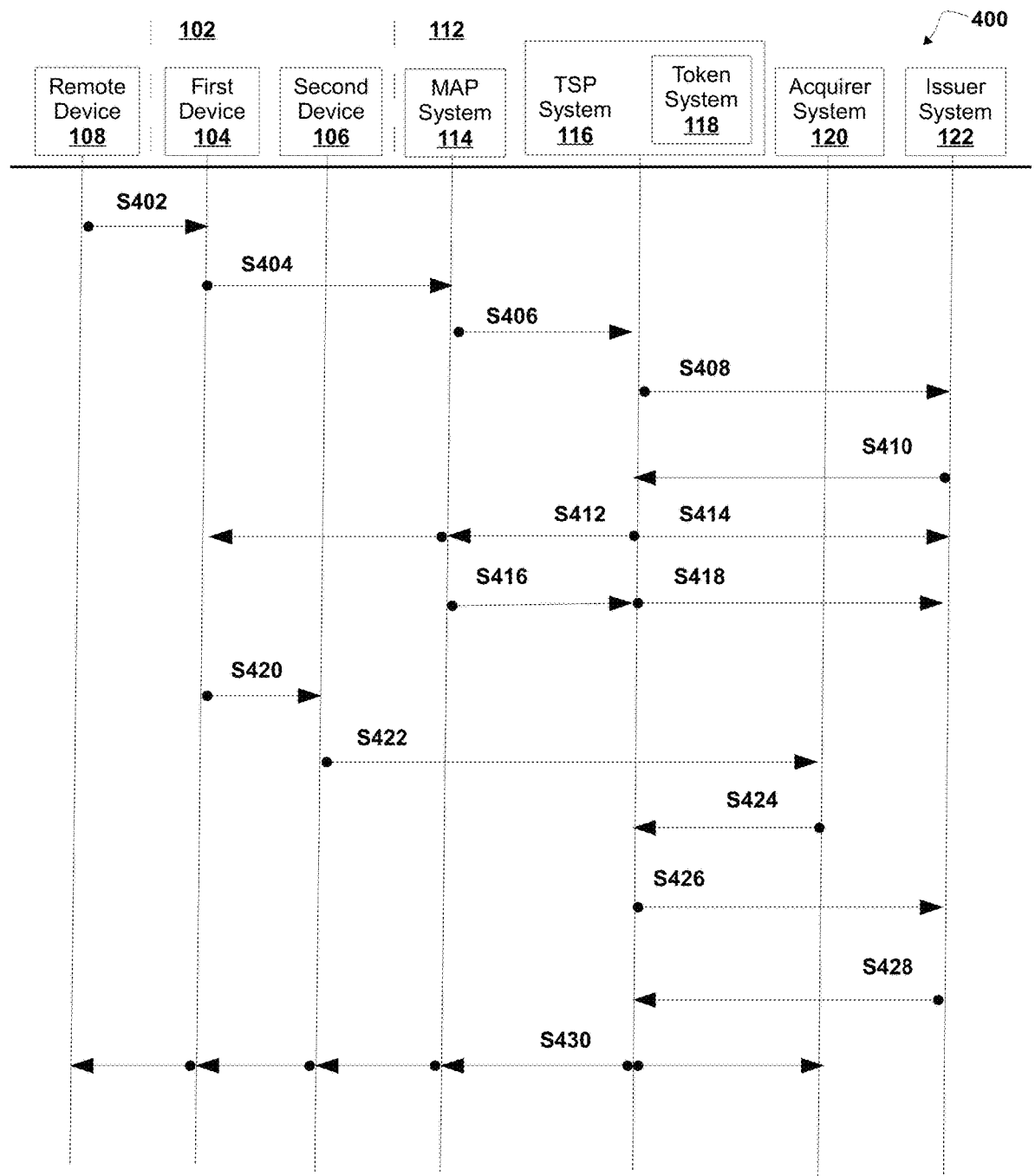
FIG. 4 is a signal flow diagram of a non-limiting embodiment or aspect of a process for automatic and remote control of near-field communication (NFC) transaction processing.

For example, and referring also to FIG. 4, in response to receiving the transaction data associated with the transaction (e.g., from remote device 108 via communication network 110, etc.) at S402, first device 104 can transmit a provision token request and transaction data associated with the transaction to mobile application (MAP) system 114 at S404. At S406, mobile application system 114 can transmit the request and associated transaction data to transaction service provider (TSP) system 116 including token system 118. At S408, transaction service provider system 116 including token system 118 can transmit a verification request for the provision token request and associated transaction data (e.g., a PAN, etc.) to issuer system 122. At S410, issuer system 122 can verify the provisioning of the token and transmit a verification of the provision token request to transaction service provider system 116 including token system 118. In response to receiving the verification of the provision token request, transaction service provider system 116 including token system 118 can transmit a token credential to MAP system 114 and provisions the token to first device 104 at S412, and can transmit a token created notification to issuer system 122 at S414. At S416, MAP system 114 can transmit a provisioning confirmation request to transaction service provider system 116 including token system 118, and transaction service provider system 116 including token system 118 can transmit a token provisioned notification to issuer system 122 at S418.

In some non-limiting embodiments or aspects, the transaction data is associated with a plurality of transactions, and first device 104 automatically requests a plurality of tokens associated with the plurality of transactions from the transaction processing network in response to receiving the transaction data. In some non-limiting embodiments or aspects, first device 104 simultaneously requests the plurality of tokens associated with the plurality of transactions from the transaction processing network in response to receiving the transaction data.

As further shown in FIG. 3, at step 308, process 300 includes receiving the token from the transaction processing network. For example, testing system 102 (e.g., one or more devices of testing system 102) can control first device 104 to receive the token from transaction processing network 112. As an example, first device 104 receives the token from transaction processing network 112.

As further shown in FIG. 3, at step 310, process 300 includes automatically and wirelessly transmitting the token from the first device to the second device via NFC in response to receiving the token from the transaction processing network. For example, testing system 102 (e.g., one or more devices of testing system 102) can control first device 104 to automatically and wirelessly transmit the token from first device 104 to second device 106 via NFC in response to receiving the token from transaction processing network 112. As an example, first device 104 can automatically and wirelessly transmit the token from first device 104 to second device 106 via NFC in response to receiving the token from transaction processing network 112.

As further shown in FIG. 3, at step 312, process 300 includes receiving the token from the first device via NFC. For example, testing system 102 (e.g., one or more devices of testing system 102) can control second device 106 to receive the token from first device 104 via NFC. As an example, second device 106 can receive the token from first device 104 via NFC. For example, and referring also to FIG. 4, second device 106 can receive the token from first device 104 via NFC at S420.

In some non-limiting embodiments or aspects, second device 106 receives the application from remote device 108, installs the application on second device 106, and controls receipt of the token from first device 106 via NFC using the application (e.g., implementing the application, initiating the application, executing the application, receiving, processing, and/or providing, with the application, data associated with a transaction, etc.). For example, a POS application installed on second device 106 can receive (e.g., from remote device 108) or include automated scripts for receiving or reading the tokens (e.g., the HCE tokens) for the account identifiers (e.g., PANs) associated with the transactions that are provisioned by the electronic wallet application and/or automated scrips for transmitting the tokens to transaction processing network 112. As an example, remote device 108 can remotely control second device 106 by transmitting a command (e.g., via a text message, etc.) to second device 106 to initiate or execute the automated scripts for receiving or reading the tokens from first device 104. For example, automated scripts executing on the electronic wallet application on first device 104 and automated scripts executing on the POS application on second device 106 can communicate via NFC for automated, real-time transaction processing (e.g., continuous transaction processing) without physical intervention. Accordingly, remote device 108 can be provided with an end-to-end software-based connection from an electronic wallet application on first device 104 to a POS application on second device 106, and through transaction processing network 112, which enables automatic and remote processing, completion, and testing of NFC HCE payments, including HCE token provisioning and HCE token processing, from a remote location.

In some non-limiting embodiments or aspects, second device 106 simultaneously receives a plurality of tokens from first device 106. For example, if the transaction data is associated with a plurality of transactions, second device 106 can simultaneously receive a plurality of tokens corresponding to the plurality of transactions from first device 104 via NFC.

As further shown in FIG. 3, at step 314, process 300 includes automatically transmitting the token to the transaction processing network in response to receiving the token from the first device. For example, testing system 102 (e.g., one or more devices of testing system 102) can control second device 106 to automatically transmit the token to transaction processing network 112 in response to receiving the token from first device 104. As an example, second device 106 can automatically transmit the token to transaction processing network 112 in response to receiving the token from first device 104. For example, and referring also to FIG. 4, in response to receiving the token from first device 104 via NFC at S420, second device 106 can automatically transmit the token to acquirer system 120 via communication network 110 at S422.

In some non-limiting embodiments or aspects, second device 106 simultaneously transmits a plurality of tokens to transaction processing network 112. For example, if the transaction data is associated with a plurality of transactions, second device 106 can simultaneously transmit a plurality of tokens corresponding to the plurality of transactions to transaction processing network 112 via communication network 110.

As further shown in FIG. 3, at step 316, process 300 includes receiving an authorization response associated with the transaction from the transaction processing network. For example, testing system 102 (e.g., one or more devices of testing system 102) can control second device 106 to receive an authorization response associated with the transaction from transaction processing network 112. As an example, the authorization response may include the response code from transaction processing network 112 referring to a successful approval/completion of a transaction, denial because card reported as lost or stolen, do not honor, partial approval, VIP approval (VIP program), amount exceeds maximum, insufficient funds, incorrect token, incorrect PIN, suspected fraud, activity amount exceeded, allowable number of PIN-entry tries exceeded, and/or the like.

For example, and referring also to FIG. 4, in response to receiving the token from second device 106 at S422, acquirer system 120 can provide the token to transaction service provider system 116 including token system 118 at S424. At S426 transaction service provider system 116 including token system 118 can determine the PAN associated with the token and transmit the token and associated PAN to issuer system 122. At S428, issuer system 122 can transmit an authorization response associated with the transaction to transaction service provider system 116, acquirer system 120, and second device 106, which is forwarded by transaction service provider system 116 at S430 to acquirer system 120, MAP system 114, second device 106, first device 104, and/or remote device 108.

As further shown in FIG. 3, at step 318, process 300 includes determining a compatibility of an application associated with at least one of the first device and the second device with the transaction processing network based on the authorization response. For example, testing system 102 (e.g., one or more devices of testing system 102) can determine a compatibility of an application associated with at least one of first device 104 and second device 106 with transaction processing network 112 based on the authorization response. As an example, first device 104, second device 106, and/or one or more other devices in testing system 102 can determine a compatibility of an application, which is associated with first device 104 and/or second device 106, with transaction processing network 112 based on the authorization response.

In some non-limiting embodiments or aspects, a compatibility of an application, which is associated with first device 104 and/or second device 106, with transaction processing network 112 is associated with a correct response code (e.g., approval, denial, etc.) being received for the transaction. For example, testing system 102 can compare the response code and/or other transaction data returned by transaction processing system 112 to the token and/or other transaction data received by second device 106 and/or submitted to transaction processing system 112 to determine the compatibility. As an example, testing system 102 can determine that an application is incompatible with one or more of first device 104, second device 106, and/or transaction processing network 112 (e.g., incompatible with token provisioning specifications, device specifications, communication specifications or protocols, data format specifications or protocols, etc. associated with first device 104, second device 106, and/or transaction processing network 112) in response to receiving an authorization response referring to a denial and/or error in processing of a transaction because of an incorrect token, a communication failure between one or more of first device 104, second device 106, and/or transaction processing network 112, a data loss between one or more of first device 104, second device 106, and/or transaction processing network 112, and/or the like.

In some non-limiting embodiments or aspects, testing system 102 (e.g., one or more devices of testing system 102) determines a compatibility of using the application (e.g., implementing the application, initiating the application, executing the application, receiving, processing, and/or providing, with the application, data associated with a transaction, etc.) on first device 104 with transaction processing network 112. For example testing system 102 can determine a compatibility of an electronic wallet application on first device 104 with transaction processing network 112 (and/or a POS application on second device 106).

In some non-limiting embodiments or aspects, testing system 102 (e.g., one or more devices of testing system 102) determines a compatibility of using the application (e.g., implementing the application, initiating the application, executing the application, receiving, processing, and/or providing, with the application, data associated with a transaction, etc.) on second device 106 with transaction processing network 112. For example, testing system 102 can determine a compatibility of a POS application on second device 106 with transaction processing network 112 (and/or an electronic wallet application on first device 104).

In some non-limiting embodiments or aspects, testing system 102 (e.g., one or more devices of testing system 102) transmits the authorization response to remote device 108, and remote device 108 determines the compatibility of the application, which is associated first device 104 and/or second device 106, with transaction processing network 112 based on the authorization response.

As further shown in FIG. 3, at step 318, process 300 includes providing data associated with the compatibility of the application to the remote device via the communications network, the data including an indication of whether the transaction is successfully processed by the transaction processing network. For example, testing system 102 (e.g., one or more devices of testing system 102) can transmit data associated with the compatibility of the application to remote device 108 via communication network 110, the data including an indication of whether the transaction is successfully processed by transaction processing network 112.

Figure 5A:
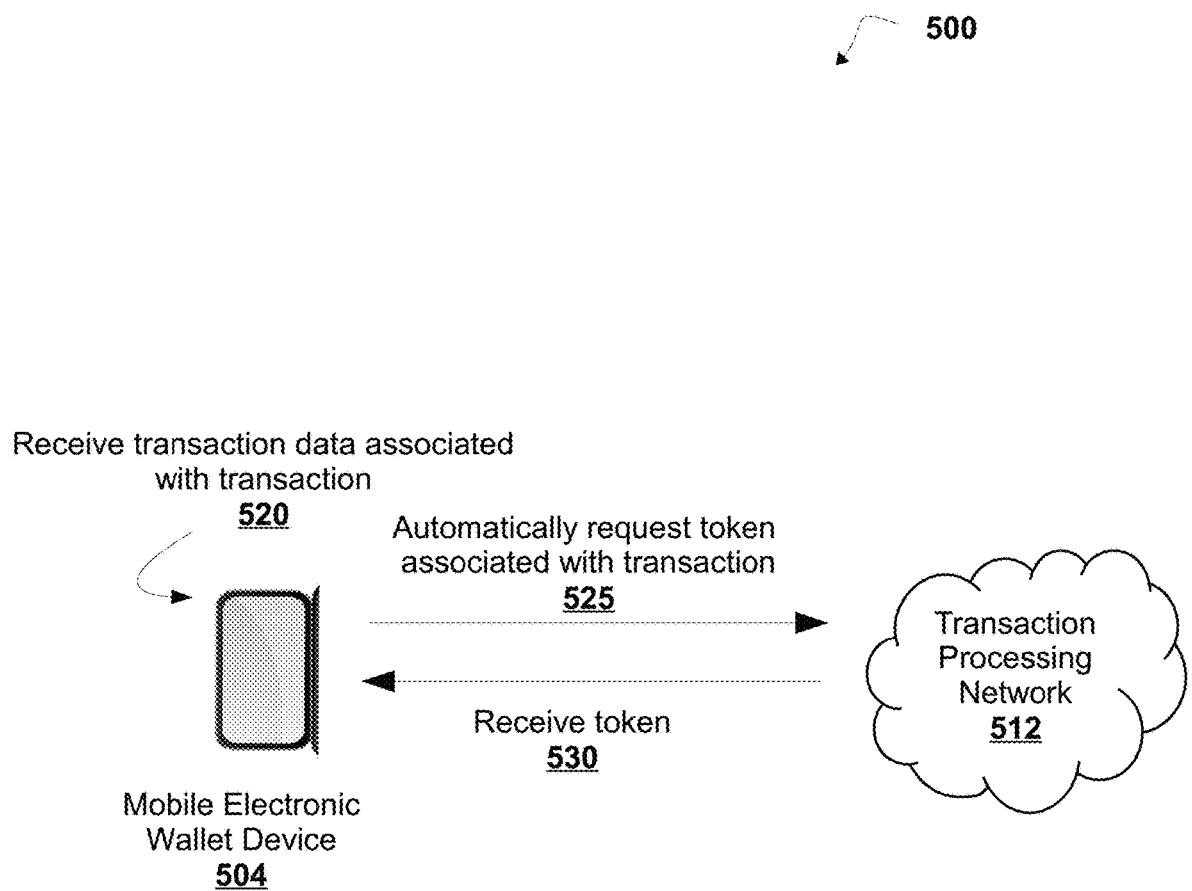
FIGS. 5A-5C are diagrams of an implementation of a non-limiting embodiment or aspect of the process shown in FIG. 3.
Figure 5B:
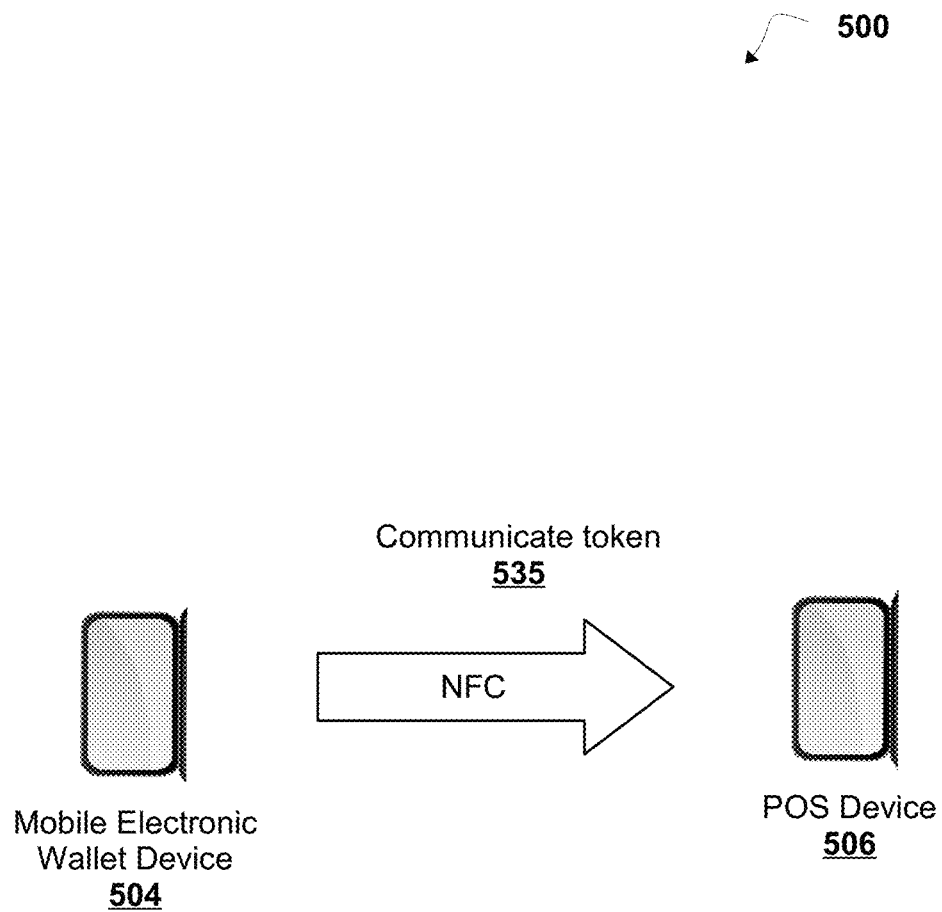
Figure 5C:
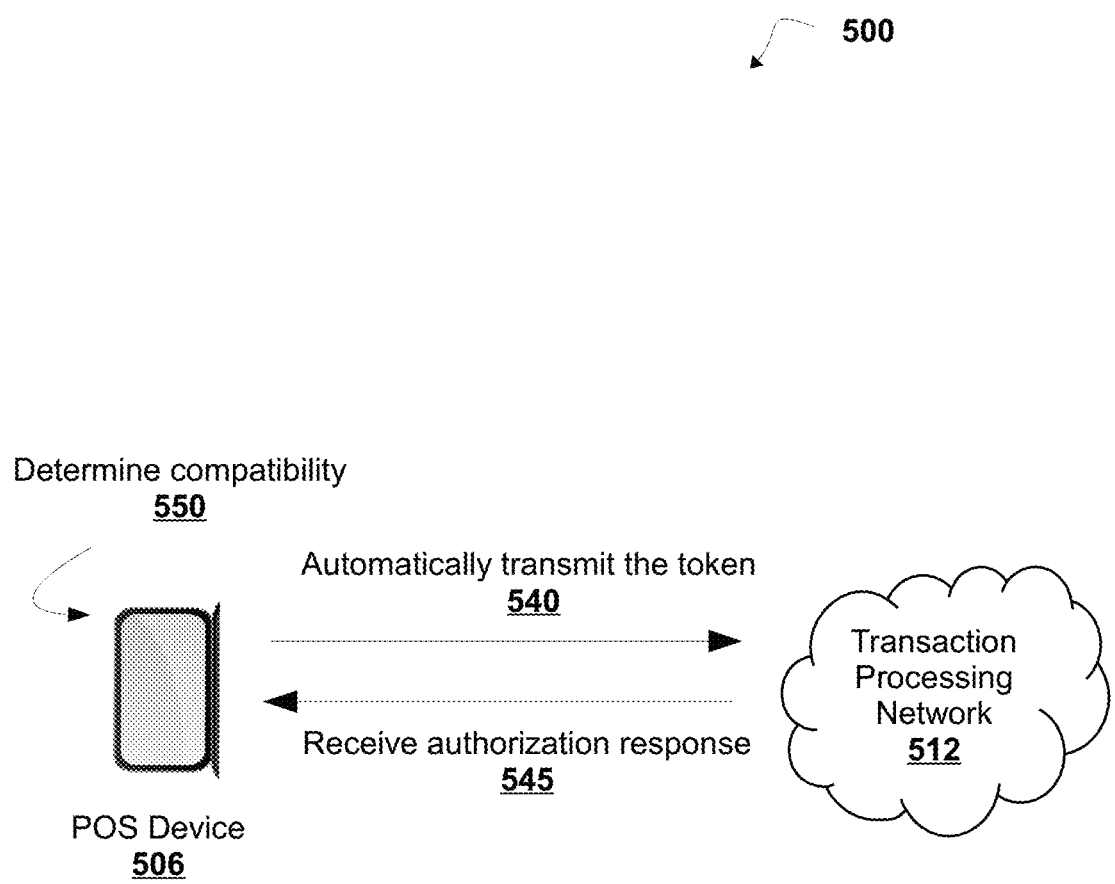

FIGS. 5A-5C are diagrams of an overview of a non-limiting embodiment or aspect of an implementation 500 relating to process 300 shown in FIG. 3. As shown in FIGS. 5A-5C, implementation 500 may include mobile electronic wallet device 504, POS device 506, and/or transaction processing network 512. In some non-limiting embodiments or aspects, mobile electronic wallet device 504 may be the same or similar to first device 104. In some non-limiting embodiments or aspects, POS device 506 may be the same or similar to second device 106. In some non-limiting embodiments or aspects, transaction processing network 512 may be the same or similar to transaction processing network 112.

As shown by reference number 520 in FIG. 5A, mobile electronic wallet device 504 may receive transaction data associated with a transaction.

As shown by reference number 525 in FIG. 5A, mobile electronic wallet device 504 may automatically request a token associated with the transaction from transaction processing network 512 in response to receiving the transaction data.

As shown by reference number 530 in FIG. 5A, mobile electronic wallet device 504 may receive the token from transaction processing network 512.

As shown by reference number 535 in FIG. 5B, mobile electronic wallet device 504 may communicate the token via NFC to POS device 506. For example, mobile electronic wallet device 504 and POS device 506 can be located within a NFC range of each other. As an example, mobile electronic wallet device 504 may automatically and wirelessly transmit the token to POS device 506 via NFC in response to receiving the token from transaction processing network 512, and POS device 506 may receive the token from mobile electronic wallet device 504 via NFC.

As shown by reference number 540 in FIG. 5C, POS device 506 may automatically transmit the token to transaction processing network 512 in response to receiving the token from mobile electronic wallet device 504.

As shown by reference number 545 in FIG. 5C, POS device 506 may receive an authorization response associated with the transaction from transaction processing network 512.

As shown by reference number 550 in FIG. 5C, POS device 506 may determine a compatibility of an application, which is associated with mobile electronic wallet device 504 and/or POS device 506, with transaction processing network 512 based on the authorization response.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

The invention claimed is:

1. A method for automatic testing of near-field communication (NFC) transaction processing, the method comprising:

providing a testing system including a first device and a second device located within a NFC range of each other at a testing location, wherein the second device includes a point-of-sale application including an automated script for reading a token associated with a transaction from the first device, and wherein the token is provisioned from a transaction processing network by an electronic wallet application;

receiving, with the first device, the token associated with the transaction;

executing, with the second device, the automated script to automatically and wirelessly read the token from the first device via NFC;

automatically transmitting, with the second device, the token to the transaction processing network in response to receiving the token from the first device;

in response to automatically transmitting the token to the transaction processing network, receiving, with the second device, an authorization response associated with the transaction from the transaction processing network, the authorization response including a response code indicating an authorization of the transaction or a denial of the transaction;

receiving, with at least one processor, the response code;

determining, with at least one processor, based on the response code indicating a denial of the transaction, that at least one of the electronic wallet application and the point-of-sale application is incompatible with at least one of the first device, the second device, and the transaction processing network; and providing, with at least one processor, an indication that the at least one of the electronic wallet application and the point-of-sale application is incompatible with the at least one of the first device, the second device, and the transaction processing network.

2. The method of claim 1, wherein the first device receives the token associated with the transaction from a third device external to the testing location, and wherein the third device includes the electronic wallet application.

3. The method of claim 2, wherein the electronic wallet application includes an automated script for provisioning the token associated with the transaction, and wherein the method further comprises:

executing, with the third device, the automated script to provision the token associated with the transaction, wherein executing the automated script includes automatically requesting, with the third device, the token associated with the transaction from the transaction processing network; and communicating, with the third device, to the first device, the token associated with the transaction.

4. The method of claim 1, wherein the first device includes the electronic wallet application, wherein the electronic wallet application includes an automated script for provisioning the token associated with the transaction, and wherein the method further comprises:

receiving, with the first device, transaction data associated with the transaction; and executing, with the first device, the automated script to provision the token associated with the transaction based on the transaction data, wherein executing the automated script includes automatically requesting, with the first device, the token associated with the transaction from the transaction processing network based on the transaction data.

5. The method of claim 4, wherein the second device includes automated scripts for generating the transaction data associated with the transaction, and wherein the method further comprises:
executing, with the second device, the automated scripts to generate the transaction data associated with the transaction; and
communicating, with the second device, to the first device, the transaction data associated with the transaction.

6. The method of claim 4, further comprising:
receiving, with the second device, from a third device external to the testing location, the transaction data associated with the transaction.

7. The method of claim 6, further comprising:
receiving, with the first device, from the third device external to the testing location, the electronic wallet application;
installing, with the first device, the electronic wallet application on the first device; and
receiving, with the first device, from the third device, a command to provision the token associated with the transaction, wherein the first device executes the automated script in response to receiving the command.

8. The method of claim 1, further comprising:
receiving, with the second device, from a third device external to the testing location, the point-of-sale application; and
installing, with the second device, the point-of-sale application on the second device.

9. The method of claim 8, further comprising:
receiving, with the second device, from the third device, a command to read the token from the first device; and
in response to receiving the command from the third device, executing, with the second device, the automated script to read the token from the first device, wherein executing the automated script includes automatically and wirelessly reading, with the second device, the token from the first device via NFC.

10. The method of claim 8, wherein the transaction includes a plurality of transactions, and wherein the method further comprises:
executing, with the second device, the automated script to read a plurality of tokens from the first device, wherein executing the automated script includes substantially simultaneously reading, with the second device, the plurality of tokens from the first device.

11. A system for automatic testing of near-field communication (NFC) transaction processing, the system comprising:
a testing system comprising a first device and a second device located within a NFC range of each other at a testing location, wherein the testing system is accessible via a communication network by a third device external to the testing location, wherein the second device includes a point-of-sale application including an automated script for reading a token associated with a transaction from the first device, wherein the token is provisioned from a transaction processing network by an electronic wallet application, wherein the first device is programmed or configured to:
receive the token associated with the transaction;
wherein the second device is programmed or configured to:
execute the automated script to automatically and wirelessly read the token from the first device via NFC;
automatically transmit the token to the transaction processing network in response to receiving the token from the first device; and
in response to automatically transmitting the token to the transaction processing network, receive an authorization response associated with the transaction from the transaction processing network, the authorization response including a response code indicating an authorization of the transaction or a denial of the transaction; and
at least one processor programmed or configured to:
receive the response code;
determine, based on the response code indicating a denial of the transaction, that at least one of the electronic wallet application and the point-of-sale application is incompatible with at least one of the first device, the second device, and the transaction processing network; and
provide an indication that the at least one of the electronic wallet application and the point-of-sale application is incompatible with the at least one of the first device, the second device, and the transaction processing network.

12. The system of claim 11, wherein the first device receives the token associated with the transaction from the third device external to the testing location, and wherein the third device includes the electronic wallet application.

13. The system of claim 11, further comprising:
the third device external to the testing location, wherein the electronic wallet application includes an automated script for provisioning the token associated with the transaction, and wherein the third device is programmed or configured to:
execute the automated script to provision the token associated with the transaction, wherein executing the automated script includes automatically requesting, with the third device, the token associated with the transaction from the transaction processing network; and
communicate, to the first device, the token associated with the transaction.

14. The system of claim 11, wherein the first device includes the electronic wallet application, wherein the electronic wallet application includes an automated script for provisioning the token associated with the transaction, and wherein the first device is further programmed or configured to:
receive transaction data associated with the transaction; and
execute the automated script to provision the token associated with the transaction based on the transaction data, wherein executing the automated script includes automatically requesting, with the first device, the token associated with the transaction from the transaction processing network based on the transaction data.

15. The system of claim 14, wherein the second device includes automated scripts for generating the transaction data associated with the transaction, and wherein the second device is further programmed or configured to:
execute the automated scripts to generate the transaction data associated with the transaction; and
communicate, to the first device, the transaction data associated with the transaction.

16. The system of claim 14, wherein the second device is further programmed or configured to receive, from the third device external to the testing location, the transaction data associated with the transaction.

17. The system of claim 14, wherein the first device is further programmed or configured to:
  receive, from the third device external to the testing location, the electronic wallet application;
  install the electronic wallet application on the first device; and
  receive, from the third device, a command to provision the token associated with the transaction, wherein the first device executes the automated script in response to receiving the command.

18. The system of claim 11, wherein the second device is further programmed or configured to:
  receive, from the third device external to the testing location, the point-of-sale application; and
  install the point-of-sale application on the second device.

19. The system of claim 18, wherein the second device is further programmed or configured to:
  receive, with the second device from the third device, a command to read the token from the first device; and
  in response to receiving the command from the third device, execute the automated script to read the token from the first device, wherein executing the automated script includes automatically and wirelessly reading, with the second device, the token from the first device via NFC.

20. The system of claim 18, wherein the transaction includes a plurality of transactions, and wherein the second device is further programmed or configured to:
  execute the automated script to read a plurality of tokens from the first device, wherein executing the automated script includes substantially simultaneously reading, with the second device, the plurality of tokens from the first device.

* * * * *